United States Patent [19]

Passariello

[11] 4,407,737
[45] * Oct. 4, 1983

[54] CATALYSTS FOR HETEROGENEOUS SYNTHESIS

[75] Inventor: Attilio Passariello, Tivoli, Italy

[73] Assignee: Ammonia Casale S.A., Lugano, Switzerland

[ * ] Notice: The portion of the term of this patent subsequent to Feb. 14, 1995 has been disclaimed.

[21] Appl. No.: 340,888

[22] Filed: Jan. 19, 1982

[30] Foreign Application Priority Data

Jan. 21, 1981 [IT] Italy ............................... 19226 A/81

[51] Int. Cl.$^3$ ......................... B01J 23/76; B01J 21/12
[52] U.S. Cl. ..................................... 502/243; 502/251
[58] Field of Search ................. 252/455 R, 462, 466 J

[56] References Cited

U.S. PATENT DOCUMENTS 4,073,749  2/1978  Passariello ...................... 252/455 R Primary Examiner—Carl F. Dees
Attorney, Agent, or Firm—Holman & Stern

[57] ABSTRACT

In the process for the preparation of catalysts for heterogeneous synthesis, particularly for the ammonia synthesis, in which a mixture of magnetite and oxides of calcium, aluminium, potassium and silicon is molten, the molten mass is air cooled, freed from the slag, crushed and powdered, the so obtained powders are pelletized and the prepared spheres are dried and sintered in an argon atmosphere, the improvement consisting in that the crushing is carried to a content of at least 80% of fine powders with a granulometry of from 325 to 400 mesh.

2 Claims, 2 Drawing Figures

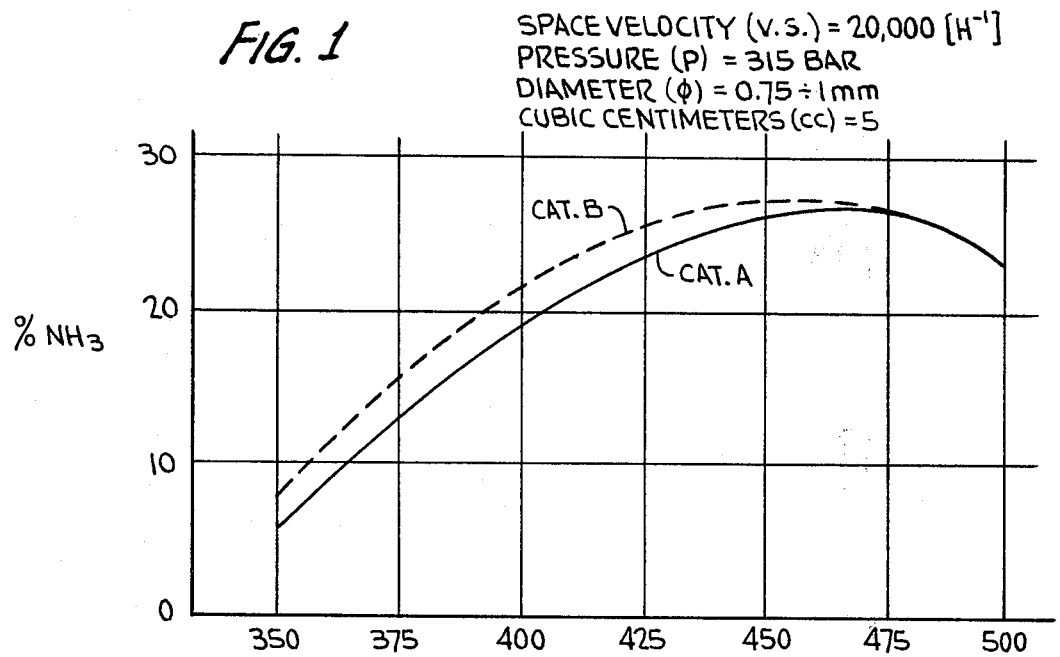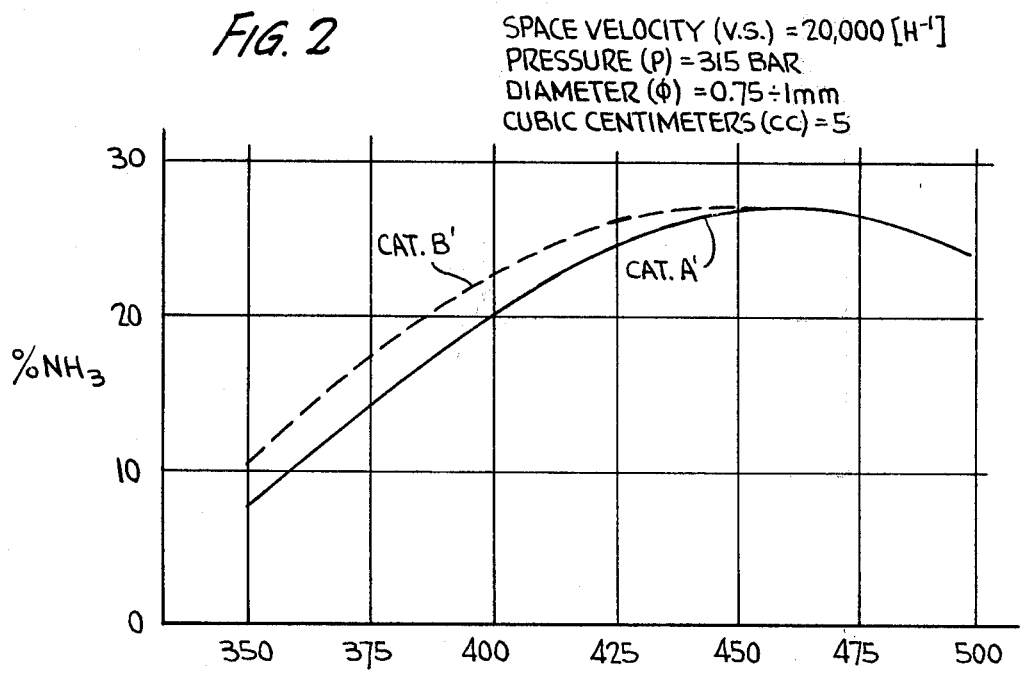

CATALYSTS FOR HETEROGENEOUS SYNTHESIS

BACKGROUND OF THE INVENTION

1. Field of the Invention

The present invention relates to a process for manufacturing catalysts for heterogeneous synthesis, particularly for ammonia, in which a mixture of magnetite and promoters, especially oxides of calcium, magnesium aluminium, potassium and silicon is prepared, the so obtained mix is molten at least at 1600° C., the molten mass is air cooled, freed from slag, crushed, milled in a rod-mill and possibly added with a binder and water, the powders are pelletised in a tray pelletiser, dried at 100° C. to 150° C. and sintered at 1200° to 1350° C. in argon atmosphere.

2. Description of the Prior Art

Such a process is described in the Italian Pat. No. 1002.972 (now assigned to the Applicant), corresponding to U.S. Pat. No. 4,073,749. In such patent neither the milling degree (grinding fineness) nor the size choice of the powders are indicated: the specification lets suppose that the parameter of the powder size be without influence also in view of the fact that the powders are utilized to form granules which act as growing centres of spheres that shall have higher diameters than those of the starting granules because these last granules shall absorb powder during their pelletisation.

SUMMARY OF THE INVENTION

By further continuing his researches in this field Applicant has now surprisingly found that the catalyst activity can be considerably improved with a crushing carried to the reaching of a major content of extremely fine powders having f.i. a content of at least 80% in powders with a granulometry of 325–400 mesh. The spheres obtained from these extremely fine powders and having any diameters (f.i. from 0.75 to 20 mm) show, at a parity of all other conditions (composition, process steps, and operative conditions for the preparation of these spheres) a catalytic activity which is sensibly superior to that of same spheres obtained however from less fine powders having a granulometry f.i. of 100 to 300 mesh.

This higher activity of the catalytic spheres prepared, at a parity of all other operative conditions, from very fine powders and in particular from powders with a granulometry of at least 325 mesh is surprising for various reasons, particularly because, according to the opinion accredited in this field, the catalytic activity is conditioned by the size and the pores diameters of the starting powders whereby it is necessary to utilize starting powders having size not below a given limit.

In particular British Pat. No. 1.484.864 describes a catalyst based on iron oxides and promoters like $K_2O$, CaO, MgO, $Al_2O_3$, $SiO_2$ which are molten, crushed and sieved in such a way to have no particles passing through a sieve of 300 mesh. In this way it is possible to obtain spherical granules having a pore volume of at least 0.01 ml/g with pores of diameter higher than $10^4$ A. On the contrary in the process according to the invention for the preparation of catalysts for heterogeneous synthesis, particularly for ammonia, in which a mix of magnetite and promoters, especially oxides of calcium, magnesium, aluminium, potassium and silicon, is prepared, the so obtained mix is molten at least at 1600° C., the molten mass is air cooled, freed from the slag, crushed and milled in a rod-mill, possibly treated with a binder and water, the relevant powders are pelletised in a tray granulator and the so obtained spheres are dried at 100°–150° C. and finally sintered at 1200°–1350° C. in argon atmosphere, Applicant succeeded in improving the catalytic activity just because the milling of the mass deriving from the lump crushing is carried up to the obtainiment of a content of at least 80% in fine powders with a granulometry of 325 to 400 mesh, which powders are collected, possibly treated, pelletised, dried and sintered.

DETAILED DESCRIPTION OF THE PREFERRED EMBODIMENTS

The different features and advantages of the invention will now better appear from the description of the not-limitative following examples.

EXAMPLE 1

By operating as in example 1 of Italian Pat. No. 1.002.972 (=U.S. Pat. No. 4,073,749) a charge is prepared which consists of:

200 kg natural magnetite
4.6 kg aluminium oxide
2.7 kg potassium
6.7 kg calcium oxide and
0.28 kg magnesium oxide, is mixed in a mixer and is molten at 1.600° C. in 1 hour. The so obtained molten mass after solidifying by cooling air within the crucible is removed from said crucible and after completion of its cooling is freed from the slag and crushed in form of irregular granules of 12 to 21 mm. This mass is transferred to a bar-mill and is milled so as to have following powder types which differ between them for the different percentages of fine powder content:

Conventional powder type A
Powder type B according to the invention.

| Powder type | MESH | | | | |
| --- | --- | --- | --- | --- | --- |
| | 60–100 | 100–230 | 230–270 | 270–325 | 325–400 |
| A | 20,94 | 11,60 | 22,54 | 44,92 | — |
| B | — | 1,00 | 5,8 | 7,4 | 85,8 |

The powder type A was obtained by milling during two hours 100 kg of catalytic mass of irregular size of 12 to 21 mm; the powder type B was obtained by further continuing the milling for at least another hour.

By always operating according to Italian Pat. No. 1.002.972, 5 kg powders A are taken out on one side and 5 kg of powders B are taken on the other side and to each one of said powder types 0.25% (by weight) bentonite and 8% (by weight) water are added; each separate powder is pelletised on a tray pelletiser from which spherical granules having diameters of 0.75 to 1 mm are obtained which granules are treated in a radiation furnace for the preliminary drying at 150° C. and for the successive sintering at 1.280° C. in argon atmosphere.

Two catalysts were thus obtained, i.e. CAT. A (from conventional powders) and CAT. B (from fine powders according to the invention). Each one of said catalysts has been tested in an experimental reactor obtaining the data shown in the diagrams of FIG. 1, which refer, for laboratory needs, to the spherical catalysts of diameter comprised between 0.75 and 1 mm.

The activity measures were carried out, each time, in the following experimental conditions:

Catalyst Volume: 5 cc
Weight: 12,38 g
Pressure: 315 bars
Spatial velocity: 20.000 $H^{-1}$
Feeding gas: $H_2:N_2=3:1$ As it appears from FIG. 1, just in the range of the temperatures more frequently utilized in the ammonia reactors, especially in the axial-radial reactors according to other applicant's patents, i.e. from 350° to 450° C., CAT. B (from fine powders according to the invention) shows an activity higher than that of conventional catalyst CAT. A.

EXAMPLE 2

A catalyst (CAT.A') is prepared from powder A' according to example 1 of applicant's patent application Ser. No. 117,780.

This catalyst CAT. A' was prepared from a 200 kg charge of natural magnetite, 4.5 kg aluminium oxide, 2.7 kg potassium, 6.7 kg calcium oxide, 0.28 kg magnesium oxide and 1.44 kg silica; said charge was transferred in a mixer and was thereafter molten at 1.600° C. within 1 hour. The mass so obtained by melting, after solidifying by cooling air within the crucible, was removed therefrom and after completion of its cooling, was freed from the slag, crushed in irregular pieces of 12 to 21 mm and pulverized in a bar-mill for 2 hours. Powder (A') taken in a quantity of 5 kg from said bar-mill had following granulometric composition.

| (A') mesh | 60–100 | 100–230 | 230–270 | 270–325 |
|---|---|---|---|---|
| % | 20,94 | 11,60 | 22,54 | 44,92 |

The quantity of powders remaining in the bar-mill (after the extraction of the first 5 kg of powders A') was further milled for another hour (total milling time=3 hours) up to the obtainiment of a powder B' having following granulometric composition:

| (B') mesh | 60–100 | 100–230 | 230–270 | 270–325 | 325–400 |
|---|---|---|---|---|---|
| % | — | 1,0 | 5,8 | 7,4 | 85,8 |

On each powder A' (5 kg) and powder B' (5 kg) was separately sprayed, in a mixer, a solution of 0.2 kg cerium nitrate Ce $(NO_3)_3$ $6H_2O$ in 0.2 kg water (1.29% by weight of metallic cerium on the final product CAT. A' respectively CAT. B').

The respective products A' and B' were separately granulated in form of spherical granules having diameter of 0.75 to 1 mm, which were treated in an electric furnace for the preliminary drying at 150° C. and, thereafter, for the successive sintering (always in the same furnace) in an argon atmosphere at 1.350° C.

Each one of the said catalysts, i.e. CAT. A' (from conventional powders) and CAT. B' (from fine powders according to the invention) was tested in an experimental reactor obtaining the data of FIG. 2, which refer, for laboratory needs, to two spherical catalysts having each a diameter comprised between 0.7 and 1 mm.

The activity measures were carried out, each time, in the same experimental conditions of the above example 1, i.e.:
  Catalyst volume: 5 cc
  Weight: 12,10 g
  Pressure: 315 bars
  Spatial velocity: 20.000 $H^{-1}$
  Feeding gas: $H_2:N_2=3:1$ As it can be seen from curves CAT. A' and CAT. B' of FIG. 2, just in the interval of the temperatures more frequently utilized in the ammonia reactors, especially in the above mentioned axial-radial reactors, i.e. in the interval from 350° to 450° C., CAT. B' (from the fine powders of the invention) shows an activity higher than that of CAT. A' (from conventional powders).

EXAMPLE 3

Example 2 of applicant's Application Ser. No. 117,780, was repeated as follows:

on 2.8 kg of catalyst A' powder obtained from the bar-mill of the above example 2 and showing the granulometric composition (A') of same example 2, was sprayed a solution of 0.2 kg of cerium nitrate in 0.1 kg water to obtain 2.3% (by weight) of metallic Ce in the final product A".

Obviously this catalyst powder A" had the same granulometric composition of catalyst A' of example 2, from which it differs only for the major content of Ce (2.3% in A" against 1.29% in A'). 2.8 kg of powder B' (as prepared in the above example 2 by continuing the milling for at least a further hour) having the granulometric composition B' of said example 2, were also treated with a solution of 0.2 kg cerium nitrate in 0.1 kg water to obtain a metallic cerium content of 2.3% (by weight) in the final product (B"). From powders A" resp. B", CAT. A" and CAT. B" were prepared by pelletising, drying at 150° C. and sintering in argon at 1.350° C. powders A" resp. B".

By operating in the same condition of the above example 2, activity measures were carried out which demonstrated a behaviour qualitatively and quantitatively similar to that of said example 2, namely CAT. B" (from fine powders with a content of 2.3% metallic cerium) had an activity higher than that of CAT. A" (from conventional powders with the same content of 2.3% Ce).

EXAMPLE 4

Example 3 of above mentioned applicant's patent application was repeated, i.e. 5 kg of powder A' of the above example 2 were treated with 0.1 kg cerium nitrate solution in 0.2 kg water so as to have 0.64% metallic cerium in the final product (CAT. A") obtained after pelletising drying and sintering in the same conditions of the above examples 2 and 3. 5 kg of the same powder A' having the granulometry A' of said example 2 were further milled for at least another hour up to the obtainment of powder B' of same example 2. On this powder B' was sprayed a solution of 0.1 kg cerium nitrate in 0.2 kg water so as to obtain 0.64% metallic cerium in a final product CAT. B'" prepared by pelletising drying at 150° C. and sintering in argon at 1.350° C.

Experimental tests were carried out on catalysts CAT.A'" and CAT. B'" in the same operative conditions of the above example 2 and an activity of CAT. B'" higher than that of CAT. A'" was noted even if CAT. B'" had exactly the same final composition of CAT. A'" but differs from same CAT. A'" only for a different granulometry.

EXAMPLE 5

Measures of Characteristics

On the catalytic spheres of different catalysts, f.i. CAT. A and CAT. B of example 1, after the execution of the activity measures and after a passivation with a stream of nitrogen containing 0.1% oxygen, were determined the total porosity and the superficial area.

The results are the following:

|  | Powder type A | Powder type B |
|---|---|---|
| Volume of pores having radius comprised between | | |
| $50.10^4 \div 7.510^4$ Å ml/100 g | 0,6 | 1,43 |
| 7-5000 $\div$ 37,5 Å ml/100 g | 10,9 | 11,60 |
| Total porosity ml/100 g | 11,5 | 13,03 |
| Superficial area m$^2$/g | 12,8 | 12,7 |

What is claimed is:

1. In the process for the preparation of catalysts for heterogeneous synthesis, particularly of ammonia, in which a mix of magnetite and promoters, especially oxides of calcium, magnesium, aluminium, potassium and silicon is prepared, the so obtained mix is molten at at least 1,600° C., the molten mass is air cooled, the lump is freed from the slag and crushed, and the so obtained mass is milled in a bar-mill, the relevant powders are pelletised in a tray pelletiser and the so prepared spheres are dried at 100°–150° C. and finally sintered at 1200°–1350° C. in argon atmosphere, the improvement consisting in that the milling of the mass obtained from crushing the lump is carried to reach a content of at least 80% in fine powders having a granulometry from 325 to 400 mesh and in that said fine powders are collected, are pelletised, dryed and sintered.

2. A process according to claim 1, in which said fine powders are treated with an aqueous solution of cerium.

* * * * *